(12) United States Patent
Weiss

(10) Patent No.: US 6,930,598 B2
(45) Date of Patent: Aug. 16, 2005

US006930598B2

(54) HOME GATEWAY SERVER APPLIANCE

(76) Inventor: Eugene S. Weiss, 2208 Lombard St., Philadelphia, PA (US) 19146

( * ) Notice: Subject to any disclaimer, the term of this patent is extended or adjusted under 35 U.S.C. 154(b) by 271 days.

(21) Appl. No.: 10/145,702

(22) Filed: May 16, 2002

(65) Prior Publication Data

US 2003/0217110 A1 Nov. 20, 2003

(51) Int. Cl.[7] .......................... H04Q 1/30; G05B 19/00; H04L 1/00
(52) U.S. Cl. ..................... 340/531; 340/3.43; 340/7.29; 370/242; 370/908; 709/224
(58) Field of Search .......................... 340/531, 539.1, 340/539.18, 500, 3.43, 7.29, 815.4, 815.45, 310.01–310.08, 593.1; 709/224, 218, 223; 370/241, 242, 254, 392, 908, 910

(56) References Cited

U.S. PATENT DOCUMENTS

| | | | |
|---|---|---|---|
| 5,410,754 A | 4/1995 | Klotzbach et al. | 370/85.13 |
| 5,905,777 A | 5/1999 | Foladare et al. | 370/90.01 |
| 5,917,405 A * | 6/1999 | Joao | 340/426.17 |
| 6,160,477 A * | 12/2000 | Sandelman et al. | 340/506 |
| 6,233,330 B1 | 5/2001 | McClure et al. | 379/212 |
| 6,271,752 B1 * | 8/2001 | Vaios | 340/541 |
| 6,300,966 B1 | 10/2001 | Gregory et al. | 345/736 |
| 6,308,272 B1 | 10/2001 | Pearce | 713/200 |
| 6,362,747 B1 | 3/2002 | Parker | 340/691.6 |
| 6,400,265 B1 * | 6/2002 | Saylor et al. | 340/531 |
| 6,404,743 B1 * | 6/2002 | Meandzija | 370/254 |
| 2001/0030950 A1 | 10/2001 | Chen et al. | 370/329 |
| 2001/0033567 A1 | 10/2001 | Frati | 370/352 |
| 2002/0037004 A1 | 3/2002 | Bossemeyer et al. | 370/356 |

* cited by examiner

Primary Examiner—Donnie L. Crosland
(74) Attorney, Agent, or Firm—Welsh & Flaxman LLC

(57) ABSTRACT

A home gateway server appliance allows home computers and other networked electronic devices to communicate with one another, operate without direct interaction with external networks, provide a variety of network services to computers and other devices both within the home and, at the owner's discretion, connected through the Internet, and provide a mechanism whereby members of the household may be informed of certain network related events without having to use their home computer or other client device.

28 Claims, 4 Drawing Sheets

Home Gateway Server Appliance

Figure 1  Home Gateway Server Appliance

HOME GATEWAY SERVER APPLIANCE

BACKGROUND OF THE INVENTION

1. Field of the Invention

The invention relates to a home gateway server appliance. More particularly, the invention relates to a home gateway server appliance allowing home computers and other networked electronic devices to communicate with one another, operate without direct interaction with external networks, provide a variety of network services to computers and other devices both within the home and, at the owner's discretion, connected through the Internet, and provide a mechanism whereby members of the household may be informed of certain network related events without having to use their home computer or other client device.

2. Description of the Prior Art

As those skilled in the art certainly appreciate, the future of the Internet lies in high speed access systems with a fixed Internet address assigned to each connection. These systems offer many opportunities, but also include some risk. Generally, high-speed Internet connections are permanently "on" allowing both "push" and "pull" communications to be conducted on a 24-hour basis.

However, most home computers are intended to operate only part time. Home computers consume a considerable amount of electricity and some of their components degrade with continuous use. In addition, some popular consumer operating systems become unstable if not periodically rebooted. Further, security on home computers is notoriously bad.

In addition to the movement toward high-speed access systems, many households include more than one home computer or other network-capable device. These households often rely upon multiple Internet connections to achieve access for the various computers, connect to the Internet through only one home computer, or utilize a single Internet connection shared between the machines via a router/gateway appliance.

Currently available router/gateway appliances typically include several Ethernet ports with a simple firewall. Some router/gateway appliances also include the ability to share a printer, as well as take advantage of wireless LAN technologies, particularly IEEE 802.11b.

For example, U.S. patent application Publication No. 2002/0037004 to Bossemeyer discloses a home gateway system. The home gateway system allows all communication devices within the household to communicate with the external environment via a single routing device. The gateway system includes both a router and a processor. The gateway system further downloads e-mails. The system allows the user to telephone in to listen to announcements relating to the various received e-mails, and to choose to listen to their text in an electronic voice. Further, U.S. Pat. No. 6,362,747 to Parker discloses a security alarm keypad with a message alert. In accordance with the disclosed invention, an alarm control panel is connected to an e-mail server. A remote alarm control panel retrieves e-mail messages and provides a user monitoring the panel with an alarm regarding the arrival of new e-mail. The alarm maybe provided in the form of a display on the keypad. In accordance with alternate embodiments, users may be warned as to retrieved e-mail messages via an answering machine or a conventional telephone system. Similarly, U.S. patent application Publication No. 2001/003095 to Chen et al. discloses a broadband communication access device. The device includes a gateway interface. The interface device includes a screen for providing users with ongoing information. The gateway interface also includes a removable module that maybe used as a portable wireless hand-held device. The gateway interface allows multiple home users to access the Internet and obtain desired information. The interface also provides multiple functionalities for handling an in-home communication system. U.S. Pat. No. 6,233,330 to McClure et al. discloses a telephone call screening device. The device functions as a router for telephone calls and provides users with an alarm function activated based upon user preferences.

According to Yankee Group research, in 2001 the number of U.S. households with broadband Internet access increased from 5.6 million, representing 10% of households online, to 10 million households, representing 16% of households online. Worldwide, the DSL Forum reports 18.7 millions users and expects the number to rise to 200 million by 2005. Roughly a third of U.S. households with home computers have more that one, and the number is rising. The number of households that could benefit from reliable and inexpensive home networking is numbered in the millions and rising rapidly.

Along with this growth has come a growth in the sale of network hubs and simple firewalls. Linksys, the market leader in these products with roughly a 70% share, shipped 1.7 million broadband routers and one million wireless LAN devices in 2001. This represents an increase of 180% in wired routers from year 2000 sales and an increase from zero for wireless type devices.

There are numerous devices available called "home gateways" or "router/gateways." A router/gateway allows several computers to communicate with one another, and to share a broadband Internet connection. They work as routers by matching local network addresses and the hostnames of the local computers with the actual networking hardware detected. As gateways, they translate local network addresses to those used by the Internet for outgoing communications, and do the opposite translation for incoming packets. They typically include several Ethernet ports and a simple firewall. Recently, the ability to share a printer has been added to some of these router/gateways. Similar devices are available which take advantage of wireless LAN technology, particularly IEEE 802.11b.

Home users also have available to them embedded devices which perform a single network service, such as a "web server in a box" to host a simple web site. Other devices exist for file sharing and printer sharing.

Businesses have much more sophisticated and expensive technology available to them. Most businesses currently use a collection of server computers for routing, as firewalls, and to provide file and print sharing for the LAN. These collections of server computers also provide websites and Internet access to those outside of it. Businesses with lesser needs can buy integrated "microservers", such as the Cobalt Qube, made by Sun Microsystems, which combine many of these services in a single preconfigured device. Small communications oriented single-board computers are used to provide monitoring functions in an industrial environment.

More specifically, the Cobalt Qube is an x86 CPU based device that provides all the key server functions needed by a home network. It also provides the power to support a business with dozens of connected computers. For example, it supports up to 150 users, and can handle 350 million web objects and 400 thousand e-mails in a single day. As those skilled in the art certainly appreciate, such microservers are more powerful than needed for a home network, and the least expensive version of the Cobalt Qube costs approximately $1,149.00.

In addition to the Cobalt Qube, many small communications oriented boards exist for industrial applications. They are often based on the AMD SC520 processor and the PC 104 platform. Jumptec is a leading manufacture of these products.

The devices discussed above may be superficially similar to the present home gateway server appliance based upon the mechanical components contained therein. However, they are optimized for very different purposes. Notably, none of the microserver or communications computers discussed above possess a ringer or other signaling device to inform persons as to the occurrence of an event. In view of the intended use and the functionality offered by the present home gateway server appliance, the provision of an alarm system is a key distinction for a device intended for the home instead of the workplace environment.

In a workplace environment it is assumed that employees are at their computers when they need to be and that one (or more) employee(s) is responsible for monitoring what the communications computer is generating. In a home environment, none of these assumptions hold true. As such, a signaling system that keeps the household from having to monitor or frequently check for network and/or communication events becomes a highly valuable addition. The only other device currently available for performing such a function are dedicated Internet telephones having a ringer included therewith. However, Internet telephones are highly limited and do not offer users functionalities beyond telephony.

In addition to the microservers and communication computers discussed above, Internet computers, or thin clients, have been developed. The most notable of these is the New Internet Computer (NIC). This device is very different in purposed from the present home gateway server appliance and does not include a static mass storage device which may be written upon, readily upgraded or otherwise varied.

With the foregoing in mind, a need currently exists for a home gateway server appliance offering convenience and functionality to the home user at a very reasonable price. The present invention provided such an appliance.

SUMMARY OF THE INVENTION

It is, therefore, an object of the present invention to provide a home gateway server appliance. The appliance includes a communication hub, a network server and an audio alarm notifying users of a communication or network event.

It is also an object of the present invention to provide a home gateway server appliance wherein the communication hub includes a first communication member interfacing a global communication network and a second communication member providing communication with various client devices that might be connected to the server appliance.

It is another object of the present invention to provide a home gateway server appliance wherein the first communication member is an Ethernet controller chip.

It is a further object of the present invention to provide a home gateway server appliance wherein the first communication member is a cable modem chip.

It is also another object of the present invention to provide a home gateway server appliance wherein the first communication member is a DSL modem chip.

It is still another object of the present invention to provide a home gateway server appliance wherein the second communication member is an Ethernet switch chip.

It is yet a further object of the present invention to provide a home gateway server appliance wherein the alarm is an audio alarm.

It is also an object of the present invention to provide a home gateway server appliance wherein the alarm is a visual alarm.

It is another object of the present invention to provide a home gateway server appliance wherein the network server operates under an open source code operating system.

It is a further object of the present invention to provide a home gateway server appliance wherein the network server is an x86 compatible processor.

It is also an object of the present invention to provide a home gateway server appliance wherein the network server provides functionalities chosen from the group consisting of software package manager, standard web server, LAN routing, SNMP, LAN e-mail management, mail fetching, file and printer sharing, SSH, FTP server, SSL capabilities, instant messaging, setting up VPN, Perl scripting and security monitoring.

It is yet another object of the present invention to provide a home gateway server appliance including a remote user interface.

It is still a further object of the present invention to provide a home gateway server appliance wherein the user interface is a web browser operating on a home computer connected to the home gateway server appliance.

It is also an object of the present invention to provide a home gateway server appliance including a memory device coupled to the network server.

It is another object of the present invention to provide a home gateway server appliance including a mass storage device coupled to the network server.

It is also another object of the present invention to provide a home gateway server appliance wherein the communication hub includes an input for connection to a standard telephone line.

It is a further object of the present invention to provide a home gateway server appliance wherein the communication hub includes an input for connection via an IEEE 1394 interface.

It is also an object of the present invention to provide a home gateway server appliance including a USB host controller chip.

It is another object of the present invention to provide a home gateway server appliance including a supplemental alarm.

It is a further object of the present invention to provide a home gateway server appliance which is upgradeable with new software offering different functionalities.

It is still another object of the present invention to provide a home gateway server appliance wherein the device is able to control computer peripherals.

It is also another object of the present invention to provide a home gateway server appliance wherein the device is able to share computer peripherals among several computers.

It is a further object of the present invention to provide a home gateway server appliance wherein the communication hub employs short-range wireless technology.

It is still a further object of the present invention to provide a home gateway server appliance wherein the communication hub includes means for connection to wireless broadband global communication network services.

It is also an object of the present invention to provide a home gateway server appliance wherein an audio device plays spoken messages, either from pre-recorded sound files or computer generated speech.

It is another object of the present invention to provide a home gateway server appliance including means for functioning as a telephone answering machine.

It is also a further object of the present invention to provide a home gateway server appliance including means for permitting the sending and receiving of facsimile messages.

It is yet another object of the present invention to provide a home gateway server appliance wherein an alarm is activated upon the occurrence of an event chosen from the group consisting of an Internet telephony connection attempt, receipt of an Internet instant messaging request and the receipt of an e-mail message from a particular sender.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
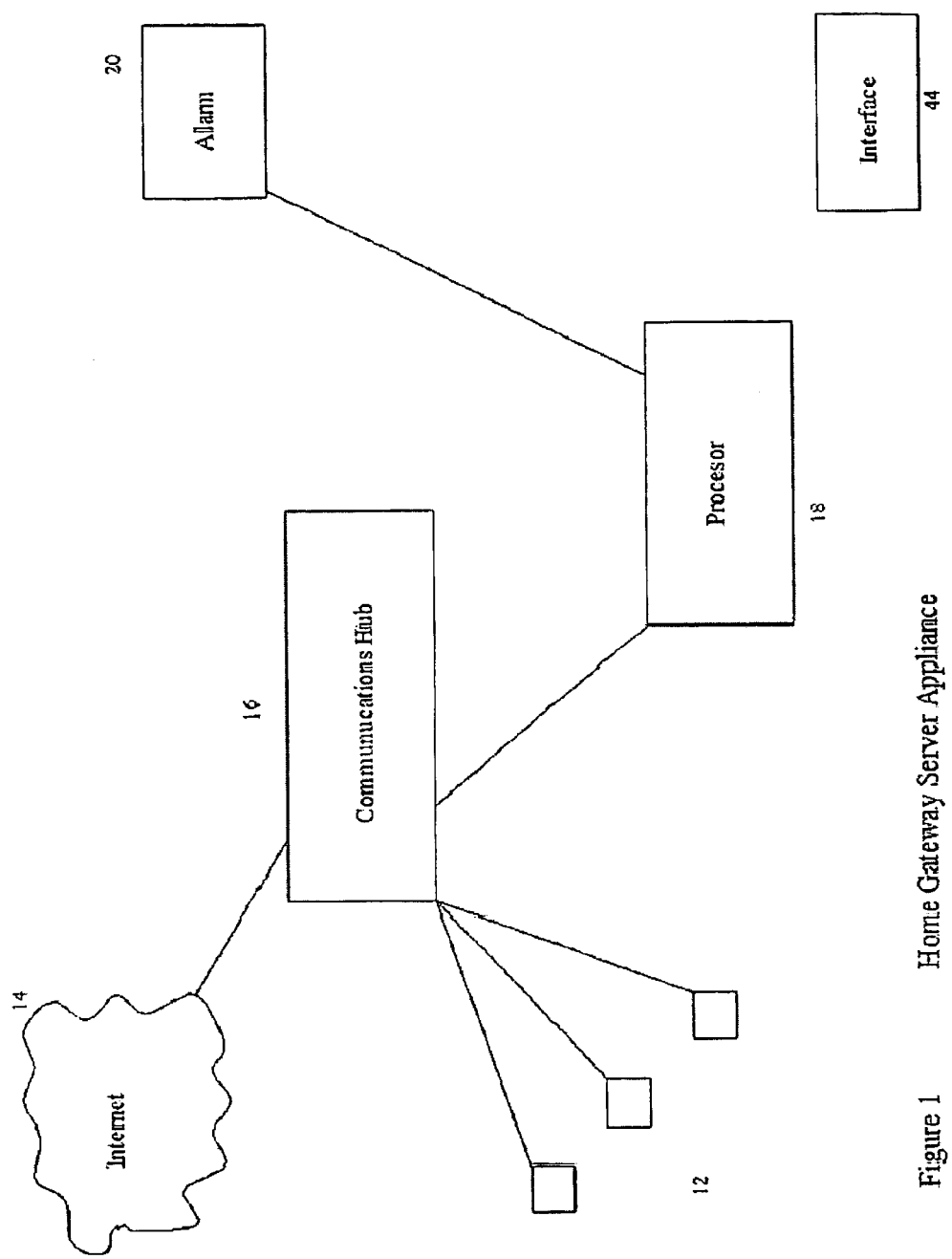
FIG. 1 is a schematic of the present server appliance's components.
Figure 2:
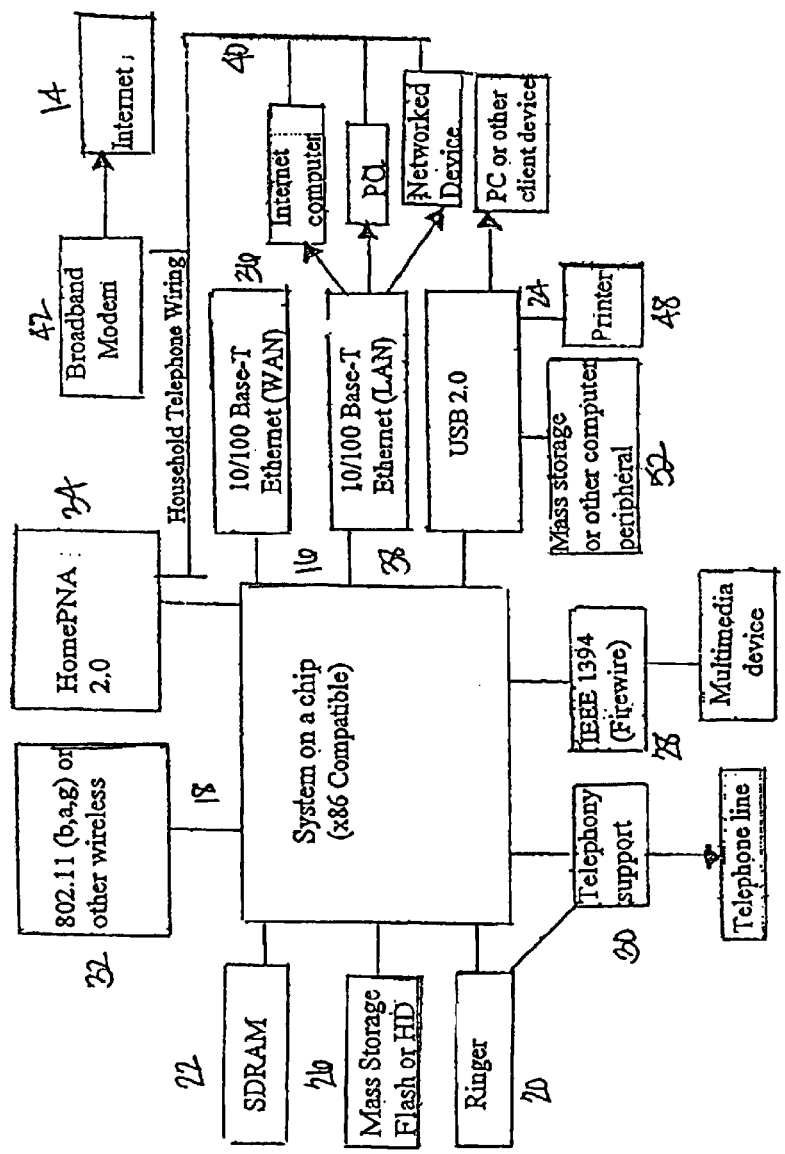
FIG. 2 is a schematic of a preferred embodiment of the present server appliance.
Figure 3:
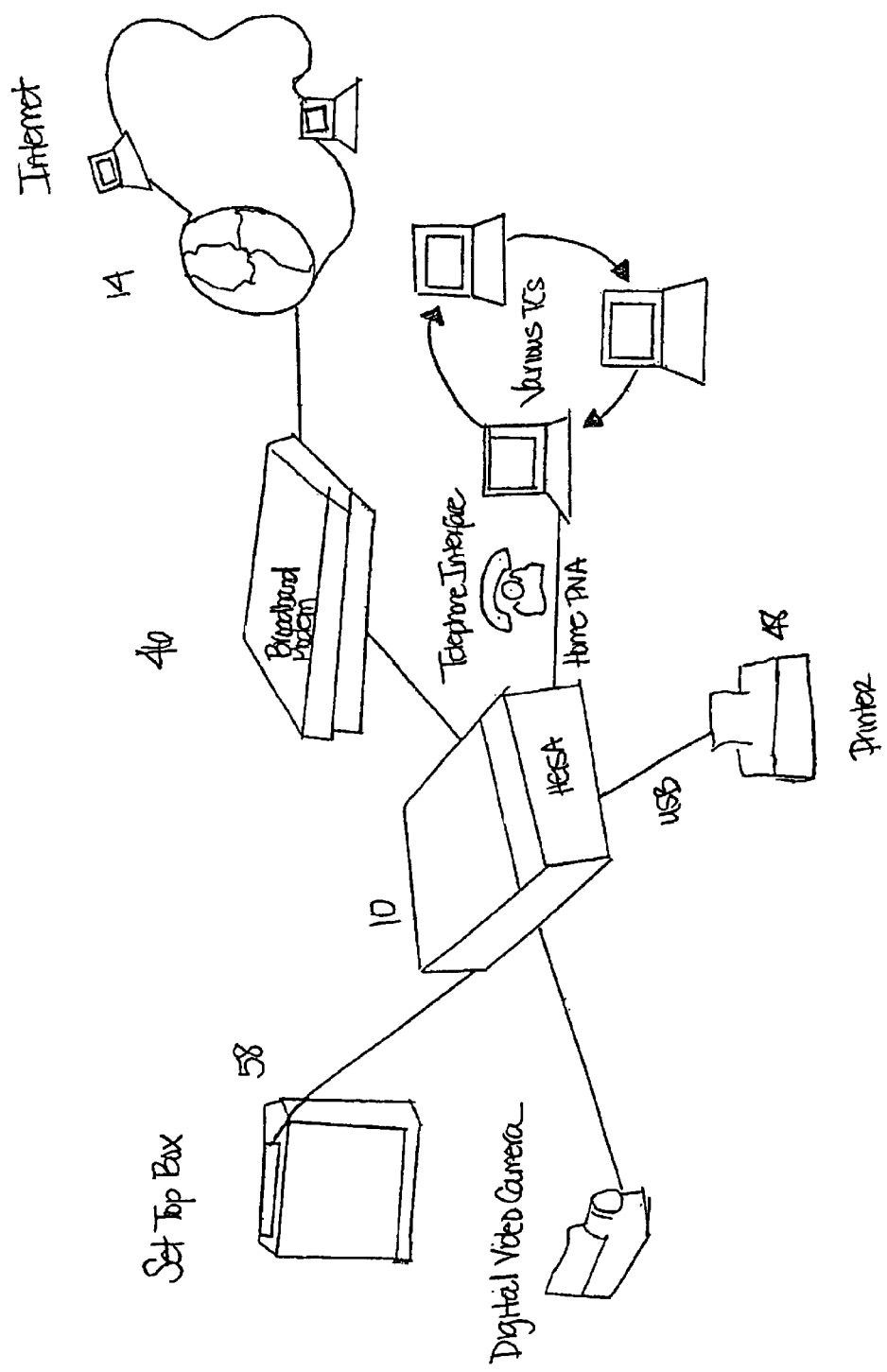
FIG. 3 is a schematic of a preferred embodiment for set up of the present server appliance.
Figure 4:
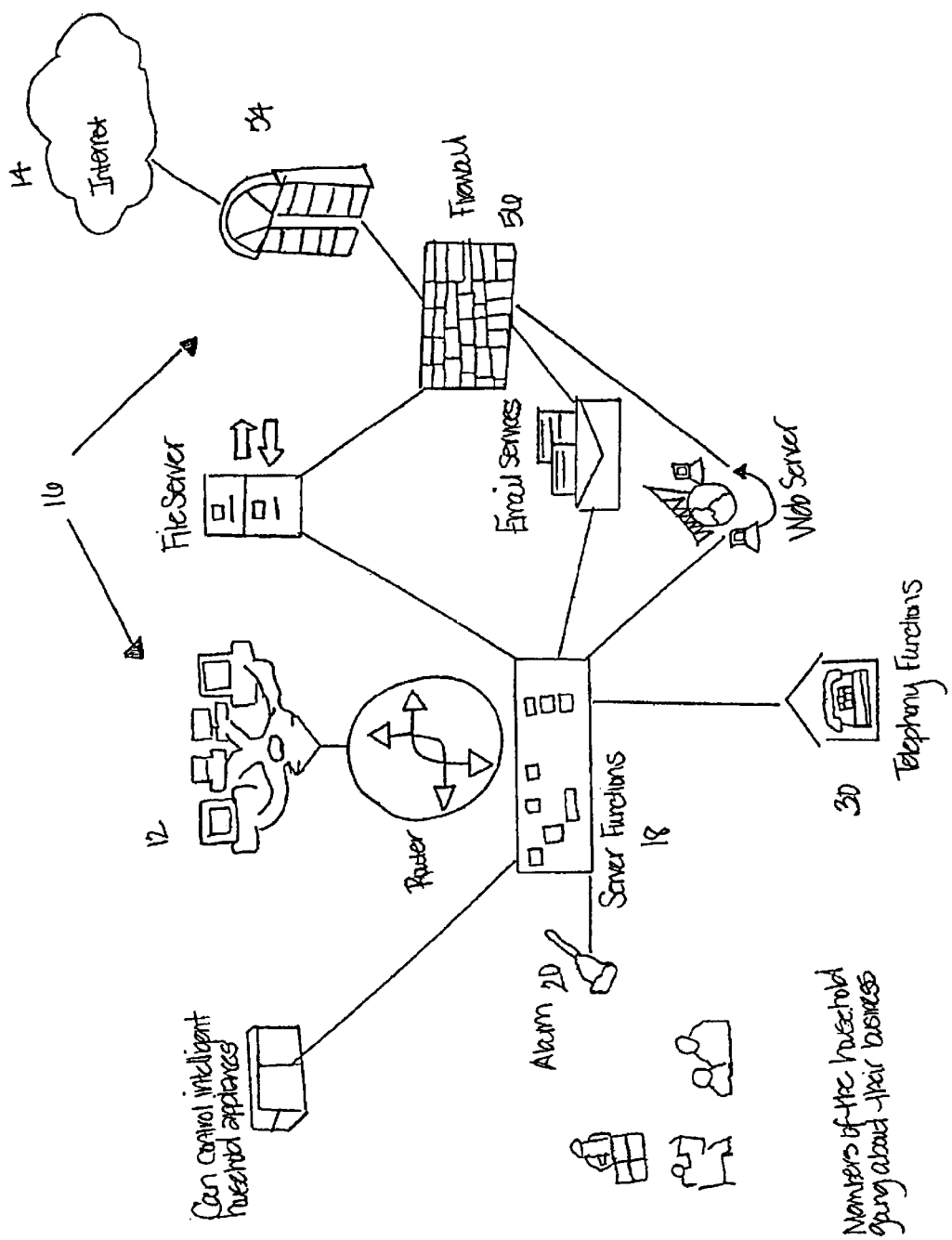
FIG. 4 is a schematic of showing various functions of the present server appliance.

With reference to FIGS. 1, 2, 3 and 4, a home gateway server appliance 10 is disclosed. The server appliance 10 links one, or a plurality of, home computer(s) 12 to a global communication network 14, for example, the Internet, without requiring that each individual home computer 12 be directly connected thereto. By linking one or more home computers 12 to a global communication network 14, or other wide area network (WAN), without requiring a direct connection thereto, an individual's home computer 12 may be utilized without regard to when, and if, network events are taking place. As such, an individual's home computer 12 may be disconnected from the global communication network 14, or even turned off, without worrying that a network event will be missed. In addition, the present server appliance 10 links one or more home computers 12 to a global communication network 14 and is capable of providing for additional functionalities previously unavailable to those using their computer on an individual basis.

The term home computer is used throughout the body of the present application to refer to IBM compatible PCs (personal computer computers), Macs (Apple Macintosh computer) or other computers designed for use by one person at a time. The term may also include other network capable devices such as personal digital assistants, electronic address books, calendars and other special purpose devices.

The present server appliance 10 is composed of three primary components integrated to provide users of the present appliance 10 with previously unknown functionality and convenience. The three primary components are a communication hub 16, network server 18 and audible alarm system 20 notifying users of a communication or network event.

In addition to the primary components making up the present server appliance as discussed above, a basic embodiment of the server appliance 10 will include a 32–64 MB SDRAM 22, a USB 2.0 host controller 24 and 64 MB, or more, of flash memory for use as a mass storage device 26. The provision of the USB host controller allows for the attachment of any other networking capability having a USB based adaptor, for example, switching from wired to wireless by plugging in an IEEE 802.11b USB adaptor, using a USB broadband modem 46 and/or networking peripheral devices such as a printer 48 or digital video camera 50. While specific components are disclosed in accordance with a preferred embodiment of the present server appliance 10, those skilled in the art will certainly appreciate that technology is consistently moving forward and different components may be utilized without departing from the spirit of the present invention.

With regard to the USB host controller 24 utilized in accordance with a preferred embodiment of the present invention, it is contemplated that NEC μPD720100, VIA VT 6202, Philips or NetChip controllers are to be used although other controllers may be used without departing from the spirit of the present invention. As to the flash memory 26, a compact flash memory has been chosen in accordance with a preferred embodiment of the present invention as a low cost flash solution. However, a wide variety of mass storage devices may be utilized based upon cost and availability without departing from the spirit of the present invention.

More elaborate versions of the present server appliance 10 may be provided with an IEEE 1394 interface (or Firewire) support 28, a large capacity hard drive (or other mass storage device) 52, telephony support 30, telephone or wired networking via HomePNA 34, support for wireless networking protocols (including IEEE 802.11 or other short range wireless technology to communicate with computers and other networked devices) 32, USB networking support, connection hardware and software for wireless broadband global communication network services, and increased numbers of Ethernet and/or USB ports.

With regard to the communication hub 16 of the present server appliance 10, it may generally be thought of as a router/gateway, including a gateway 54 to external networks and a firewall 56. In providing routing functions, the communication hub 16 facilitates communication between various computers, and other devices, networked with the server appliance 10 by bridging various communication protocols and translating hardware addresses into Internet protocol addresses. In its role as a gateway, the communication hub 16 provides multiple home computers 12, and other devices, with a connection to a global communication network 14, directing packets coming from the global communication network 14 to appropriate destinations with the household network connected to the server appliance 10.

As such, a variety of embodiments are contemplated based upon the needs of specific users. For example, and with reference to FIG. 2, the communication hub 16 is composed of a first communication member 36 interfacing with the global communication network 14 or WAN and a second communication member 38 providing communication with various client devices 40 (for example, home computers, networked devices, Internet computers etc.) that might be connected to the server appliance 10.

In accordance with this embodiment, the first communication member 36 is an Ethernet controller chip, for example, a National Semiconductor DP83815 or a Realtek RTL8139. An Ethernet controller chip provides for Ethernet connection to a variety of networks. Ethernet technology accounts for the majority of installed local area networks and is defined in IEEE 802.03. Ethernet technology is typically used in conjunction with coaxial cable or special grades of twisted pairs wires, but may also be applied for use with wireless networks.

The second communication member 38 in accordance with a preferred embodiment of the present invention is an Ethernet switch chip, such as a Marvell 88E6050 or a Realtek 8305S. As discussed above, the second communication member 38 is designed to provide for communication with the one or more home computers, or other networked devices, connected to the present server appliance 10. The present server appliance 10 is able to provide for the sharing of computer peripherals 40 among several home computers 12 connected via the present server appliance 10.

While it is contemplated that the first communication member 36 connects to a global communication network 14 via an Ethernet switch chip, the first communication member 36 may include a cable modem chip or DSL modem chip 42. Specifically, a cable modem chip is a device enabling hook up of one's home computer to a local cable TV line in a manner providing for the receipt of data at about 1.5 Mbps. This data rate far exceeds prevalent 28.8 and 56 Kbps telephone modems and the up to 128 Kbps of Integrated Services Digital Network (ISDN), and is about the data rate available to subscribers of Digital Subscriber Line (DSL) telephone service. Most cable modems include two connections: one to the cable wall outlet and the other to a PG or to a set-top box 58 for a TV set. Although a cable modem does modulation between analog and digital signals, it is a much more complex device than a telephone modem. It can be an external device or it can be integrated within a computer or set-top box. Typically, the cable modem attaches to a standard 10-BASE T Ethernet card or a USB port in a home computer. All of the cable modems attached to a cable TV company coaxial cable line communicate with a Cable Modem Termination System (CMTS) at the local cable TV company office. All cable modems can receive from and send signals only to the CMTS, but not to other cable modems on the line. The actual bandwidth for Internet service over a cable TV line is up to 27 Mbps on the download path to the subscriber with about 2.5 Mbps of bandwidth for interactive responses in the other direction. However, since the local provider may not be connected to the Internet on a line faster than a T-carrier system at 1.5 Mpbs, a more likely data rate will be close to 1.5 Mpbs.

With regard to a DSL modem, DSL is a technology for bringing high-bandwidth information to homes and small businesses over ordinary copper telephone lines. XDSL refers to different variations of DSL, such as ADSL, HDSL, and RADSL. Assuming one's home is close enough to a telephone company central office that offers DSL service, service may be provided at data transfer rates up to 6.1 megabits (millions of bits) per second (of a theoretical 8.448 megabits per second), enabling continuous transmission of motion video, audio, and even 3-D effects. More typically, individual connections provide from 1.544 Mbps to 512 Kbps downstream and about 128 Kbps upstream. A DSL line can carry both data and voice signals and the data part of the line is continuously connected. As with a cable modem, DSL modems are commonly interface with a home computer via either a USB or an Ethernet interface.

While a preferred embodiment of the present invention respectively utilizes Ethernet controller chips and Ethernet switch chips for the first and second communication members 36, 38 of the present server appliance 10, enhanced embodiments of the present invention could be manufactured to provide for additional networking protocols. These networking protocols might include, but are not limited to, USB host-to-host networking, HomePNA, IEEE 802.11b, a and g wireless, Bluetooth and new protocols which may become available.

As discussed above, the present server appliance 10 includes a network server 18. The network server 18 substantially controls all functions associated with the operation of the present server appliance 10, for example, web server functions, e-mail services, file server functions, telephony functions, control of intelligent household appliances, as well as other functions to be discussed below in greater detail. In addition to those services the network server 18 provides to the household in which it is used, the network server provides the world with the household's public face, potentially providing web sites, files for downloading, answering machine type services, etc. The network server 18 may also function by accepting files to be uploaded and securely stored and providing secure access for private files one might wish to access while away from home. As used throughout the present disclosure, a network server 18 is meant to refer to a fully capable computer including the necessary hardware and software to provide services to other computers (clients) across a network.

In accordance with a preferred embodiment, the core of the network server 18 is a central processing unit or system on a chip, although other equivalent hardware components may be used without departing from the spirit of the present invention. For the purposes of the present disclosure, a system on a chip is defined as a CPU which includes those functions performed by a supporting chipset in a PC; that is, memory controller, ISA and PCI bus controllers, IDE (hard drive) controller, and sometimes other peripheral controllers such as serial ports, parallel ports, keyboard, mouse, video, modem, etc. In accordance with a preferred embodiment of the present invention, a system on a chip lacking many of those peripheral controllers discussed above is employed as these peripheral controllers are intended for use on client rather than server computers, and add expense to the system on a chip.

In accordance with a preferred embodiment of the present invention, the network server 18 is an x86 compatible processor. It is contemplated that a ZF Micro Solutions ZFx86-Lite or ST Microelectronics STPC Elite may be used as the network server 18. The ZF Micro Solutions ZFx86-Lite offers an x86 compatible processor with a failsafe Flash-based secondary boot system, SDRAM controller, 2 IDE channels, ISA, I²C and PCI busses and 16 GPIOs. However, those skilled in the art will certainly appreciate the wide variety of processors which may similarly be utilized without departing from the spirit of the present invention.

It is contemplated that the network server 18 will function under an open source code operating system. The operating system should be capable of supporting abundant and sophisticated software for all server functions. A preferred operating system may should be usable without license fees, permit free modification and distribution, and require no graphical interface. An operating system will be chosen which offers continuously improving security software that is to be used on the server appliance. Security fixes such these will be distributed promptly to users of the present server appliance 10. In summary, a preferred operating system will allow the present server appliance 10 to take advantage of secure and sophisticated software without incurring high software development costs.

In addition to an operating system, the present server appliance 10 may come loaded with a variety of administrative software packages implemented via the network server 18. It is contemplated that the following applications maybe utilized, although those skilled in the art will certainly appreciate other applications offering additional functionality to the present server appliance. It should be understood that this is a partial list of the most important services which will come pre-installed. Other embodiments in accordance with the present invention may include other software besides, and the owner could add additional software provided by the device's manufacturer, downloaded from the Internet, or purchased from a third-party vendor.

Software package manager.

The Apache industry standard web server. Apache is a freely available Web server distributed under an "open source" license. Version 2.0 runs on most UNIX-based operating systems (such as Linux, Solarus, Digital UNIX, and AIX), on other UNIX/POSIX-derived systems (such as Rhapsody, BeOS, and BS2000/OSD), on AmigaOS, and on Windows 2000.

Dynamic Host Configuration Protocol (DHCP) server for LAN routing, and client software for ISPs which use the protocol. DHCP is a communications protocol allowing network administrators to manage centrally and automate the assignment of Internet Protocol (IP) addresses in an organization's network. Using the Internet Protocol, each machine that can connect to the Internet requires a unique IP address. When an organization sets up its computer users with a connection to the Internet, an IP address must be assigned to each machine. Without DHCP, the IP address must be entered manually at each computer and, if computers move to another location in another part of the network, a new IP address must be entered. DHCP allows a network administrator to supervise and distribute IP addresses from a central point and automatically sends a new IP address when a computer is plugged into a different place in the network. DHCP uses the concept of a "lease" or amount of time that a given IP address will be valid for a computer. The lease time can vary depending on how long a user is likely to require the Internet connection at a particular location. Using very short leases, DHCP can dynamically reconfigure networks in which there are more computers than there are available IP addresses. DHCP supports static addresses for computers containing Web servers that need a permanent IP address. DHCP is an alternative to another network IP management protocol, Bootstrap Protocol (BOOTP). DHCP is a more advanced protocol, but both configuration management protocols are commonly used.

Simple Network Management Protocol (SNMP). SNMP is the protocol governing network management and the monitoring of network devices and their functions. It is not necessarily limited to TCP/IP networks. SNMP is described formally in the Internet Engineering Task Force (IETF) Request for Comment (RFC) 1157.

Sendmail for managing LAN e-mail.

Fetchmail for retrieving e-mail from the ISP independent of any client device.

Samba for Windows file and printer sharing. Samba is a popular freeware program that allows end users to access and use files, printers, and other commonly shared resources on a company's intranet or on the Internet. Samba is often referred to as a Network File System and can be installed on a variety of operating system platforms, including: Linux, most common UNIX platforms, Open VMS, and OS/2. Samba is based on the common client/server protocol of Server Message Block (SMB) and Common Internet File System (CIFS). Using client software that also supports SMB/CIFS (for example, most Microsoft Windows products), an end user sends a series of client requests to the Samba server on another computer in order to open that computer's files, access a shared printer, or access other resources. The Samba server on the other computer responds to each client request, either granting or denying access to its shared files and resources.

Secure Shell (SSH). SSH, sometimes known as Secure Socket Shell, is a UNIX-based command interface and protocol for securely getting access to a remote computer. It is widely used by network administrators to control Web and other kinds of servers remotely. SSH is actually a suite of three utilities—slogin, ssh, and scp—that are secure versions of the earlier UNIX utilities, rlogin, rsh, and rcp. SSH commands are encrypted and secure in several ways. Both ends of the client/server connection are authenticated using a digital certificate, and passwords are protected by via encryption. SSH uses RSA public key cryptography for both connection and authentication. Encryption algorithms include Blowfish, DES, and IDEA.

File Transfer Protocol (FTP) Server. FTP, a standard Internet Protocol, is the simplest way to exchange files between computers on the Internet. Like the Hypertext Transfer Protocol (HHTP), which transfers displayable Web pages and related files, and the Simple Mail Transfer Protocol (SMTP), which transfers e-mail, FTP is an application protocol that uses the Internet's TCP/IP protocols. FTP is commonly used to transfer Web page files from their creator to the computer that acts as their host for everyone on the Internet. It's also commonly used to download programs and other files to your computer from other servers. As a user, one can use FTP with a simple command line interface (for example, from the Windows MS-DOS Prompt window) or with a commercial program that offers a graphical user interface. A Web browser can also make FTP requests to download programs selected from a Web page. Using FTP, one may also update (delete, rename, move, and copy) files at a server.

Secure Socket Layer (SSL) capability. SSL is a commonly used protocol for managing the security of a message transmission on the Internet. SSL uses a program layer located between the Internet's Hypertext Transfer Protocol (HTTP) and Transport Control Protocol (TCP) layers. SSL is included as part of both the Microsoft and Netscape browsers and most Web server products. Developed by Netscape, SSL gained the support of Microsoft and other Internet client/server developers to become the de facto standard until the development of Transport Layer Security (TLS) (which may similarly be used in accordance with the present invention). The "sockets" part of the term refers to the sockets method of passing data back and forth between a client and a server program in a network or between program layers in the same computer. SSL uses the public-and-private key encryption system from RSA, which also includes the use of a digital certificate. TLS and SSL are an integral part of most Web browsers (clients) and Web servers. If a Web site is on a server that supports SSL, SSL can be enabled and specific Web pages can be identified as requiring SSL access. Any Web server can be enabled by using Netscape's SSLRef program library which can be downloaded for noncommercial use or licensed for commercial use. TLS and SSL are not interoperable. However, a message sent with TLS can be handled by a client that handles SSL but not TLS.

Software for all major instant messaging protocols.

All necessary software for setting up a Virtual Private Network (VPN). A (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data. Using a virtual private network involves encrypting data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPTP) and Microsoft has extended Windows NT to support it. VPN software is typically installed as part of a company's firewall server.

The Perl scripting language. Perl (Practical Extraction and Reporting Language) is a script programming language that is similar in syntax to the C language and that includes a number of popular UNIX facilities such as SED, awk, and tr. Perl is an interpreted language that can optionally be compiled just before execution into either C code or cross-platform bytecore. When compiled, a Perl program is almost (but not quite) as fast as a fully precompiled C language program. Perl is regarded as a good choice for developing common gateway interface (OGI) programs because it has good text manipulation facilities (although it also handles binary files). In general, Perl is easier to learn and faster to code in than the more structured C and C++ languages. Perl programs can, however, be quite sophisticated. Perl tends to have devoted adherents.

A variety of security monitoring programs. In accordance with a preferred embodiment of the present invention security monitoring "daemons" will be used. A "daemon" is a type of computer program that remains running in the background while the computer is on. When used in the present system they will monitor activity within the machine which would indicate a hack attempt.

Control and user programming of the present server appliance 10 is achieved via the use of a user interface 44. In accordance with a preferred embodiment of the present invention, the user interface 44 is a web browser operating on any of the home computers 12 connected to the home gateway server appliance 10, although other interface systems may be employed without departing from the spirit of the present invention. Specifically, the software for the user interface 44 is preferably based upon the Webmin system, a set of web pages and Perl-CGI scripts which control UNIX-like operating systems and most popular server software packages. Utilization of this software provides a user interface 44 which is infinitely configurable and upgradeable for the initial and ongoing needs of the appliance's software.

Contemplated examples relating to user control of the user interface 44 are present below. However, these are merely examples of possible operations and should not be construed as limiting operation of the present user interface 44 to one specific mode of operation as those skilled in the art will appreciate the many variations that could be employed without departing from the spirit of the present invention.

EXAMPLE 1

To access the setup and administration system of the server appliance from your home PC, you would open a web browser like Netscape or Internet Explorer, and type in the URL field something like "http://192.168.11.3:10000". This would bring up a web page that would prompt for a user name and password, which when entered would go to the top-level administration page. Here there would be links to pages dealing with configuration, adding new software, and specific pages for controlling the services installed. You might, for instance, decide to open a public web page, so you would go to the web server page, and type a checkbox for opening up the server to requests from the Internet. There would also be some instructions on the page on where to put your web documents in the server appliance's directory structure. The web page you have created is still on you PC. You use a Windows PC, so you click on the Network Neighborhood icon, where the server appliance appears as another computer in your LAN. Cick on its icon and again you are asked for a user name and password, which then opens up the server appliance's directory to you. You find the right directory on the server appliance, and drag the web page you just wrote from MyFiles into it. The file then copies automatically. Before you quit, you go back to the server appliance's administration page, and click on a link called "Check for Software Upgrades", which will check the manufacturer's website to see if any of the software you have installed on the server appliance has been updated. You do this now because you have just opened your server appliance up to more outside access, and there may be security bugs that have been fixed, and you have disabled the feature that periodically makes this check automatically, and "rings" the server appliance whenever there is a security upgrade available.

EXAMPLE 2

You are at an Internet cafe in Rome. You open the web browser and type your home Internet address, something like "http://206.153.21.4:1000", and you are again prompted for user name and password. You may have registered you own domain name, in which case you would type "http://howardathome.net:10000" instead. You turned on outside access to the administration page before you left. You get the same page that you saw at home. You check the picture from a security camera you set up before leaving to make sure that the house is all right, and you open access to ftp uploads. You use the ftp program on the cafe's computer to upload pictured from your digital camera. You leave the administration page and type "http://howardathome.net", where you see you public web page displaying the pictures you just uploaded.

With regard to the alarm 20 of the present server appliance 10, and in accordance with a preferred embodiment of the present invention, the alarm 20 is simply a PC speaker or a small speaker connected to an audio DAC. The speaker provides a variety of distinctive rings, sounds or verbal commands depending upon the communication or network event identified by the server appliance 10. The use of an alarm in accordance with the present invention provides a mechanism for obtaining household members' attention when a communication or network event occurs; even when the household members are not monitoring the Internet or other communication medium.

Enhancement of the alarm 20 may be provided by the inclusion of a sound chip which will provide the server appliance 10 with the ability to play a variety of sound files (for example, spoken messages from either pre-recorded sound files or computer generated speech) as indicators of communication or network events identified by the server appliance 10.

While a preferred embodiment of the present invention is constructed with a PC speaker, the speaker may be replaced with a simple buzzer, for example, a piezoelectric buzzer, or more elaborate audio notification systems. In addition it is contemplated that an audio alarm system may be supplemented by the addition of a visual signal (for use by those who are hearing disabled), waking up, turning on, or otherwise signaling a chosen client device, or dialing a telephone number and delivering a message. For example, the audio alarm signals may also be delivered to a home computer or other client device connected to the present server appliance. Similarly, the audio signals may include instructions for waking up or switching on a home computer or other client device connected to the present server appliance.

It is further contemplated that a user may specify some action taken to communicate with a client device of some sort for some events. For example, the server appliance may send a supplemental alarm when the user is not home in one of the following manners: a supplemental alarm sent via an e-mail or call a phone number when the user isn't at home; a supplemental alarm noted by the present server appliance 10 turning on a computer or other client device if it has what's called a "wake on LAN" feature; or a supplemental alarm delivered by way of a client device, for example, home computer, networked with the server appliance 10. These functions would be optional for the user to enable, and be a software feature, rather than something intrinsic to the device.

It is contemplated that the server will identify the following events and provide users with an immediate notification: an Internet telephony connection attempt, receipt of an Internet instant messaging request, or the receipt of an e-mail message from a particular sender. This list is meant to be exemplary of those events warranting an alarm and other events may be included should a user so desire.

Actual initiation of these alarms will depend upon the specific event initiating the alarm. Any event, whether initiated by the present server appliance 10 or by another device, will be handled by software on the server appliance 10. With regard to a specific application, fetchmail can be directed to download e-mail at regular intervals, or just to check the senders and subjects of mail stored on an ISP's server. Adding a single line of code to fetchmail would cause it to compare the information to a list, and if it matched to call a UNIX shell script. A UNIX shell script is a text file that executes as a simple computer program. The particular script for fetchmail would only contain a line executing an alarm script, most likely playing a particular sound file, or checking the sender's name to see if there was a personalized sound file available.

The actual contents of the fetchmail script would be written and overwritten by a web form linked to the main administration page, where the user would most likely use a pulldown list of available alarms. When the user chose an alarm from that list, the fetchmail script would be rewritten to call the user's selected alarm. Hence, every service would only need to call a single script programmed into it, and any alarm the user chose would be executed.

Services dealing with Internet communication would likely have a case in which they would want to generate an alarm. In a few cases there might be a desire to generate multiple alarms for different events.

In practice, each event to be monitored need only be associated with one script file, and there need also be only one script file for each available alarm. If a user installed a software package containing a new service it would include its event script, with a default alarm written in it, it would place that default alarm and perhaps other optional ones in a directory containing all of the alarms. It would also install a web page to let the user pick the alarm, as well as perform other setup and configuration tasks, and would place a link to that page on the primary administration page. New alarms could be installed separately by the user, and used for any event he or she wished.

All alarms are controlled by the user through a user interface (discussed above), which allows a user to readily modify and program the present server appliance. In the event of an intrusion attempt detected by internal security monitoring software loaded on the present server appliance or notification regarding a security related software update, the alarm component with notify a the user.

In addition to the functionalities discussed above, the present server appliance may be provided with software for functioning as an answering machine as well as for receiving and sending facsimile messages.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A home gateway server appliance integrating a plurality of functionalities linking a plurality of networked devices with access to a global communication network without requiring direct access thereto, comprising:

a communication hub including a first communication member interfacing a global communication network and a second communication member providing communication with various client devices that might be connected to the home gateway server appliance;

a network server; and an audio alarm notifying user of a communication or network event wherein the communication hub, network server and audio alarm are maintained within a single housing.

2. The home gateway server appliance according to claim 1, wherein the appliance is upgradeable with new software offering different functionalities.

3. The home gateway server appliance according to claim 1, wherein the first communication member is an Ethernet controller chip.

4. The home gateway server appliance according to claim 1, wherein the first communication member is a cable modem chip.

5. The home gateway server appliance according to claim 1, wherein the first communication member is a DSL modem chip.

6. The home gateway server appliance according to claim 1, wherein the second communication member is an Ethernet switch chip.

7. The home gateway server appliance according to claim 1, wherein the alarm further includes a visual alarm.

8. The home gateway server appliance according to claim 1, wherein a supplemental alarm is delivered by way of a client device networked to the home getaway server appliance.

9. The home gateway server appliance according to claim 1, further including means for the switching on of a client device upon the occurrence of an alarm event.

10. The home gateway server appliance according to claim 1, further including means for delivering a supplemental alarm by way of a telephone call.

11. The home gateway server appliance according to claim 1, wherein the network server operates under an open source code operating system.

12. The home gateway server appliance according to claim 1, wherein the network server is an x86 compatible processor.

13. The home gateway server appliance according to claim 1, wherein the network server provides functionalities chosen from the group consisting of software package manager, standard web server, LAN routing, SNMP, LAN e-mail management, mail fetching, file and printer sharing, SSH, FTP server, SSL capabilities, instant messaging, setting up VPN, Perl scripting and security monitoring.

14. The home gateway server appliance according to claim 1, further including a remote user interface.

15. The home gateway server appliance according to claim 14, wherein the user interface is a web browser operating on a home computer connected to the home gateway server appliance.

16. The home gateway server appliance according to claim 1, further including a memory coupled to the network server.

17. The home gateway server appliance according to claim 1, further including a mass storage device coupled to the network server.

18. The home gateway server appliance according to claim 1, wherein the communication hub includes an input for connection to a standard telephone line.

19. The home gateway server appliance according to claim 1, wherein the communication hub includes an input for connection via an IEEE 1394 interface.

20. The home gateway server appliance according to claim 1, further including a USB host controller chip.

21. The home gateway server appliance according to claim 1, wherein the home gateway server appliance is able to control computer peripherals.

22. The home gateway server appliance according to claim 1, wherein the home gateway server appliance is able to share computer peripherals among several computers.

23. The home gateway server appliance according to claim 1, wherein the communication hub employs short-range wireless technology.

24. The home gateway server appliance according to claim 1, wherein the communication hub includes means for connection to wireless broadband global communication network services.

25. The home gateway server appliance according to claim 1, wherein an audio device plays spoken messages, either from pre-recorded sound files or computer generated speech.

26. The home gateway server appliance according to claim 1, further including means for functioning as a telephone answering machine.

27. The home gateway server appliance according to claim 1, further including means for permitting the sending and receiving of facsimile messages.

28. The home gateway server appliance according to claim 1, wherein an alarm is activated upon the occurrence of an event chosen from the group consisting of an Internet telephony connection attempt, receipt of an Internet instant messaging request and the receipt of an e-mail message from a particular sender.

* * * * *